United States Patent [19]

Jacobs et al.

[11] 4,228,363
[45] Oct. 14, 1980

[54] MODULAR WIND ELECTRIC POWER PLANT

[76] Inventors: Marcellus L. Jacobs; Paul R. Jacobs, both of Rte. 13 - Box 722, Fort Myers, Fla. 33901

[21] Appl. No.: 26,691

[22] Filed: Apr. 3, 1979

[51] Int. Cl.³ ............................................. F03D 11/04
[52] U.S. Cl. ........................................ 290/44; 290/55
[58] Field of Search ................ 290/43, 44, 54, 55; 416/174, 194, 195, 196

[56] References Cited

U.S. PATENT DOCUMENTS

| | | | |
|---|---|---|---|
| 1,829,888 | 11/1931 | Bucklen et al. | 290/44 X |
| 2,103,910 | 12/1937 | Lung | 416/174 X |
| 3,806,733 | 4/1974 | Haanen | 290/44 X |
| 4,068,131 | 1/1978 | Jacobs et al. | 290/55 |

Primary Examiner—Gene Z. Rubinson
Assistant Examiner—W. E. Duncanson, Jr.
Attorney, Agent, or Firm—Shoemaker and Mattare, Ltd.

[57] ABSTRACT

A wind electric power plant that has the working components thereof assembled and aligned as a stub tower, then tested at the factory prior to shipment of the assembled stub tower to a use site. The power plant includes adjusting wedges for establishing and maintaining proper alignment between an alternator and a drive unit during shipment and installation.

10 Claims, 4 Drawing Figures

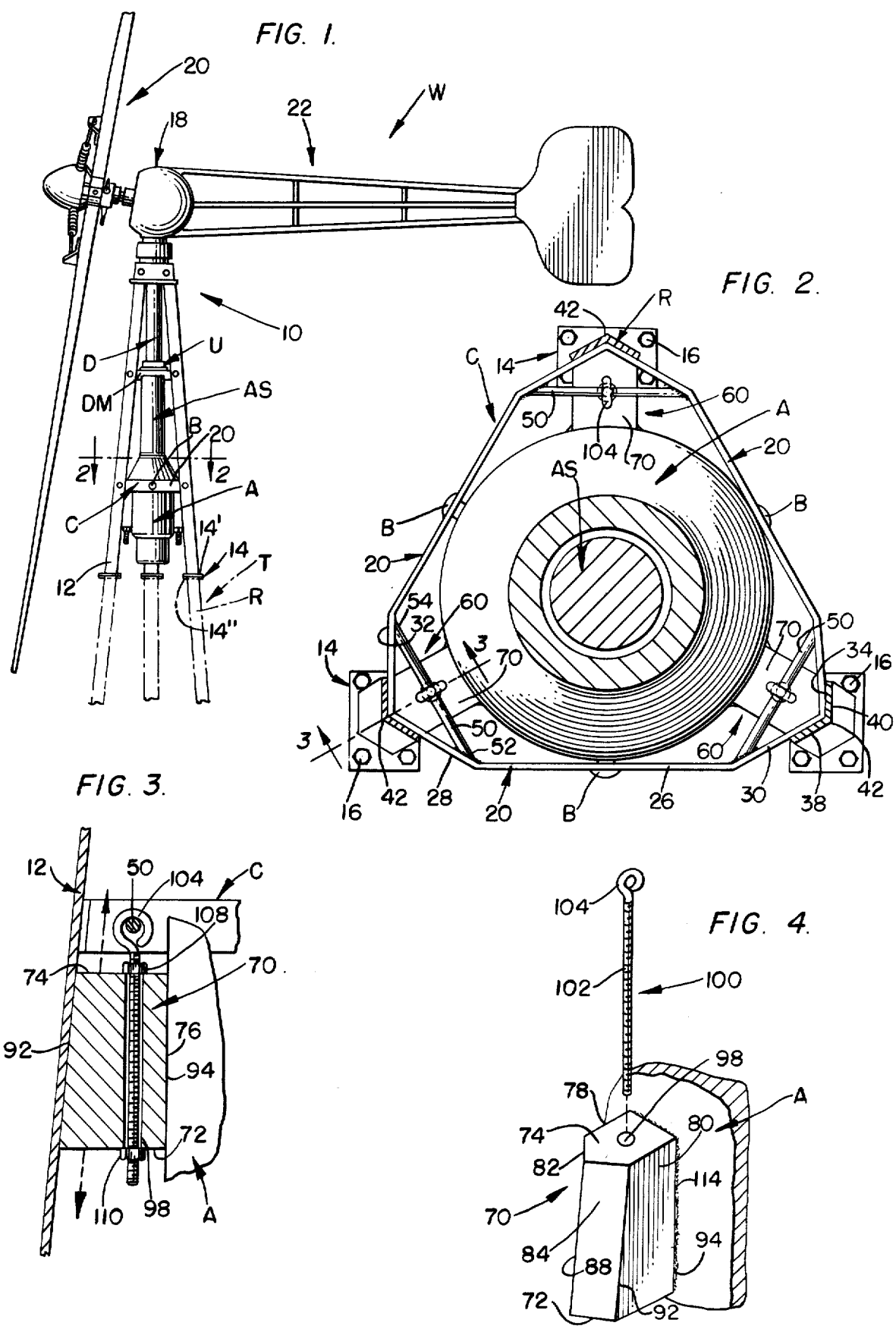

MODULAR WIND ELECTRIC POWER PLANT

BACKGROUND OF THE INVENTION

The present invention relates in general to wind electric power plants, and, more particularly, to erection of wind electric power plants.

On-site installation of wind electric plants has proven to be a very difficult and delicate operation. Known wind electric plants have required the installation of a number of components, one at a time, which must be individually hoisted to the top of a tower. Each part must be bolted individually into the tower and each component fitted to the previously mounted part as that component is hoisted in place. The proper adjustment and alignment of each part is very difficult and under adverse weather conditions is seldom, if ever, done correctly. Only at the factory, where the assembly room conditions, tools and mounting equipment, proper alignment machinery and experienced personnel are available, can this kind of equipment be assembled together and tested to ensure proper operation when the equipment is hoisted to the top of a tower and installed.

Adverse weather conditions make installation of known wind electric plants even more difficult.

Furthermore, it requires highly trained personnel to be able to assemble a wind electric plant, especially under adverse weather conditions. Such highly skilled personnel are difficult to find, and the labor costs are extremely high, and may even prove to be prohibitive in some situations.

Even using highly trained and skilled technicians, perfect in-field alignment is extremely difficult to obtain. If the components of a wind electric plant are not perfectly aligned, some efficiency of the overall plant is lost. Under some conditions, the reliability of a plant is vitiated. This problem is especially serious when the plant will be subjected to intense weather conditions which may tend to exacerbate any misalignment problems or other errors incident the erection of the wind electric plant.

A further drawback to presently known wind electric plants is the failure thereof to perform exactly to specifications due to errors in installation. Such discrepancies between specification and actual performance may lead to overtaxing the windmill, or to a dissatisfied customer, both conditions being serious.

Accordingly, there is need for a wind electric plant which can be assembled under ideal conditions, tested under ideal conditions, then shipped to the use site, and erected so that the ideal condition assembly of the plant is not vitiated. Such a power plant will perform efficiently and reliably and the performance thereof will match the performance stated in the specifications.

SUMMARY OF THE INVENTION

A wind electric power plant assembled according to the teachings of the present invention is properly aligned and will not be susceptible to failure or inefficient operation due to installation errors.

The plant includes a short top section comprising the propeller, the tail section, the gear section, the drive components and the alternator and alternator armature shaft. In other words, the short top section includes all of the working components of the wind electric power plant.

The short top section of the tower is assembled and test run at the factory and is designed to be lifted and set on top of an existing tower. The tower is installed first at the proper plant operating location. A crane or "gin pole" system can be used to lift the stub tower plant assembly up to the tower top where mounting bolts and connecting wires from the alternator can be used to complete the installation of the wind energy system.

The stub tower plant section is mounted in a crate for shipping, with the propellers and tail vane in separate crates. The propellers and vane are attached to the plant before it is hoisted to the top of the tower so that it only requires a few bolts to complete the installation when lifted to the tower top.

Using the teachings of the present disclosure, a wind energy system can be completely assembled at the factory, test operated under full power with an individual electric control panel, and crated and shipped to the installation site where it can be lifted out of the crate at the tower site and hoisted into place, completely ready to operate.

Heretofore, it has been impossible to have the opportunity to assemble the wind plant completely at the factory and test run that plant with its electric control cabinet and then ship it to the purchaser as a "package" plant fully assembled by trained factory personnel instead of hoisting each part up to the tower and assembling the plant piece by piece. Known installations depend on the ability of the installer, the weather and other factors to ensure satisfactory plant operation. The present tower is not at all so limited. The operation, efficiency and reliability of the tower depend on the skill of the trained factory personnel and the highly sensitive and precise equipment at their disposal. Of course, such trained and equipped personnel will provide a plant which is much more efficient and reliable than is possible to obtain by technicians working in the field, especially if those technicians are unskilled and/or are working under adverse weather conditions. A plant assembled and tested at the factory by skilled personnel using precise equipment under test conditions will match specifications far more closely than a plant assembled in the field by (possibly) untrained personnel working under (possibly) adverse conditions.

The alternator of the plant bolts to cross braces at the alternator frame top end. Three wedge pieces fit against the tower corner rails along each side of the alternator and are adjustable, up or down, to tighten against the frame of the alternator by an adjustment bolt in the center of each wedge. Adjustment of these wedges alters the alignment of the upper end of the alternator armature shaft where that shaft connects to the drive shaft universal joint. This adjustment permits perfect alignment of the alternator shaft with the drive shaft above it. All components can thus be properly aligned, bolted in place and test operated at the factory. The wedges also keep the alternator tight in the short tower section in which the plant is assembled and tested at the factory. The upper end of the alternator frame is supported by bolts into the tower cross member, thus shifting the wedges would change the alignment of the upper end of the alternator shaft for alignment with the drive shaft. A test tower section of special design can be used for assembly and test running the plant under full power. The test tower section replaces the tower section that will be used at the site to support the short tower section.

Using the teachings of the present disclosure, even unskilled installation labor can be used to set up a wind electric power plant without rendering that plant susceptible to failure or inefficient operation due to installation errors.

OBJECTS OF THE INVENTION

It is, therefore, a main object of the present invention to provide a wind electric plant which can be fully assembled and checked at the factory before shipment to an installation site.

It is another object of the present invention to provide a wind electric plant which is not susceptible to failure or inefficient operation due to installation errors.

It is yet another object of the present invention to provide a wind electric plant which has the component parts thereof aligned and oriented to any desired degree of accuracy.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is an elevation view of a wind electric power plant embodying the teachings of the present invention.

FIG. 2 is a view taken along line 2—2 of FIG. 1.

FIG. 3 is a view taken along line 3—3 of FIG. 2.

FIG. 4 is a perspective view of a wedge spacing block used in the wind electric power plant embodying the teachings of the present invention.

DETAILED DESCRIPTION OF THE INVENTION

Shown in FIG. 1 is a wind electric plant W embodying the teachings of the present disclosure. The plant W includes a stub tower section 10 mounted on tower corner rails R of an existing tower T. The stub tower section includes a plurality of corner rails 12 each forming a continuation of a corresponding tower corner rail and connected thereto by mounting plates 14 coupled together by coupling bolts 16 (see FIG. 2). A gear section 18 is mounted on the stub tower corner rails and a propeller section 20 and a tail section 22 are connected to the gear section to derive power from wind force. A drive shaft D depends from the gear section and has a universal joint section U on the lower terminal end thereof. The universal joint section is attached to stub tower corner rails by a mounting means DM. An alternator armature shaft section AS is attached to the drive shaft by the universal joint, and an alternator section A is mounted in the stub tower by a cross brace section C. Mounting bolts B attach the alternator top to the cross brace. Connecting wires (not shown) can also be used to mount the stub tower on the rails R. In one embodiment, three connecting wires are used.

As best shown in FIG. 2, the cross brace section includes a plurality of cross brace members 20 each of which is elongate and has a central section 26 with inturned end sections 28 and 30 which are integrally attached, as by welding, or the like, at the outer surface 32 thereof to inner surface 34 of the stub tower corner rails. The corner rails are angled and thus each includes a pair of rail webs 38 and 40 which verge to form corner 42. The abutting end edges of adjoining cross brace members abut at the corners 42, and the overall configuration of the cross brace section C thus appears as shown in FIG. 2.

A plurality of hanger rods 50 are integrally attached to the cross brace members as best shown in FIG. 2. Each rod is elongate and has the opposite ends 52 and 54 thereof integrally attached, as by welding, or the like, to adjoined cross brace members near the juncture of the end sections 52, 54 and the central section 26. Preferably, the bars are attached to the end sections 52 and 54, as shown in FIG. 2, but other locations of the hanger bars can be used. The hanger bars span each cross brace section corner section as defined by the abutting end sections 52 and 54.

As discussed above, the alternator shaft AS, and the alternator A, should be perfectly plumb with respect to the drive shaft, or perfectly aligned and colinear therewith for efficient, reliable plant operation. The plant disclosed herein includes an alignment means 60 to ensure proper alignment between the alternator, the alternator armature shaft and the drive shaft.

The alignment means 60 includes a plurality of wedge blocks 70 wedgingly interposed between the alternator A and each stub tower corner rail. The function and operation of these wedge blocks will be fully set forth after presentation of a description of the structure thereof.

As best shown in FIGS. 3 and 4, each wedge block is elongate and in the shape of a frustum of a truncated irregular pentagonal cone. Thus, as shown, each block includes a planar base 72 and a planar top 74 which are in spaced parallelism with respect to each other. Each of the blocks further includes an arcuate rear face 76 which is curved to fit snugly against the curved alternator casing. A pair of trapezoidal side faces 78 and 80 form the sides of each block, and a pair of edge adjoining rectangular front faces 82 and 84 are each joined at one longitudinal side edge thereof to one of the side faces and at the other longitudinal side edge thereof to the other front face to form a leading edge 88.

As shown in FIGS. 3 and 4, the wedge leading edge 88 is downwardly divergent from the rear face 76 so that the non-parallel edges 92 and 94 of each trapezoidal side face are downwardly divergent from each other.

Each wedge block has a bore 98 defined longitudinally thereof to extend completely through each wedge. An eye bolt 100 is received in the bore 98 and includes an externally threaded shank 102 and an eye piece 104 integrally attached to one end of the shank. A pair of set-nuts 108 and 110 are threadably mounted on the eye bolt 100 and seat against the wedge base 72 and top 74, respectively, to hold the eye bolt in place within the bore 98 as best shown in FIG. 3.

The eye pieces of the bolts receive the hanger bars therethrough as shown in FIGS. 2 and 3 to connect the wedge blocks to the tower stub section cross brace section. As best shown in FIG. 4, each wedge block is integrally mounted on the alternator housing, as by weldments 114, or the like. The alternator is thus attached to the cross brace section via the wedge blocks of the alignment means 60.

As can be seen from the Figures, a complete wind electric plant can be easily erected using the teachings of the present disclosure. Thus, tower corner rails R of the existing tower are first placed in the desired location, and the stub tower section 10 is then hoisted up by a gin pull lift, or the like, and mounted on the rails R by coupling the plates 14 together using bolts 16. As shown in FIG. 1, the stub tower section has plates 14' mounted on the bottommost end of each corner rail and the existing tower corner rails R have plates 14" mounted on the topmost end of those rails. These plates are facially engaged and bolted together to mount the stub tower 10 on top of the existing tower T.

The stub tower is assembled in a plant or factory under closely controlled conditions. Experienced and highly trained technicians can supervise and carry out the assembly in clean room conditions, using sensitive and precise instruments, and the like. The wedge blocks 10 are used to position the alternator and alternator armature shaft in perfect alignment with the drive shaft. This alignment can be carefully checked using special instruments. Such procedures cannot be carried out in the field, especially if adverse weather conditions are present, and untrained personnel are being used. In-factory alignment is carried out in the factory by technicians and produces a plant which satisfies all tolerances to extremely close limits. A plant built to such close tolerances will be extremely efficient and reliable in use, and the actual performance will closely match the specification performance.

Once the alternator and alternator armature are properly aligned with the drive shaft in the factory, tests can be performed if necessary, and other check out procedures can also be performed. After the plant is fully inspected and tested, and ready for use, the propeller and tail sections are removed and packed, preferably in separate containers, and shipped to the site at which the plant will be used. The wedges keep the alternator tightly in place in the stub tower section during shipment, and thus the alignments established at the factory will not be vitiated or destroyed during shipment, and during pre-mounting handling. At the site, the propeller section and tail section are remounted on the stub tower, and the complete, factory aligned, stub tower is hoisted on top of the existing structure as above discussed.

The wedge blocks are used to establish and maintain the desired degree of alignment between the alternator armature shaft and the drive shaft. This alignment is established by taking up the eye bolts, or backing these bolts off as required to establish the alignment. Once an eye bolt is properly set in the wedge block bore, the set nuts are securely tightened against the wedge block to prevent movement of the eye bolt with respect to the wedge block.

The eye bolts are attached to the hanger bars, and the orientation of the alternator armature shaft with respect to the drive shaft is set and maintained.

Thus, the working portion of a wind electric plant, e.g., the portion indicated herein as the stub tower, can be assembled by skilled technicians under ideal conditions, then tested by skilled technicians under ideal conditions using precise instruments, then shipped to the use site. The tower is thus fully assembled at the factory and shipped fully assembled to the use site. The fully assembled tower is then merely hoisted up and placed in position at the use site. Accordingly, there is little, if any, assembly required at the site, and the erected wind electric plant will therefore not be susceptible to errors and unreliability produced by assembly procedures.

In one embodiment, the stub tower is 6 feet in height.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A method of assembling a wind electric power plant comprising the steps of:
   assembling a stub tower section which includes a drive shaft, an alternator, and an alternator armature shaft connected to the drive shaft;
   aligning the drive and alternator armature shafts;
   testing the assembled stub tower section in a test environment;
   moving the assembled stub tower in the assembled condition to an installation site; and
   placing the assembled stub tower onto an existing support at the installation site.

2. The method defined in claim 1 wherein the wind electric power plant further includes a propeller and a tail section and wherein the propeller and tail section are moved to the installation site separately from the stub tower section.

3. The method defined in claim 1 wherein the testing step is performed at the place of assembly of the stub tower section.

4. A wind electric power plant comprising:
   a stub tower section which includes tower corner rails, a gear section mounted on said corner rails, a propeller mounted on said gear section, a tail section mounted on said gear section, a drive shaft mounted on said gear section, an alternator mounted on said tower corner rails, an alternator armature shaft connecting said alternator to said drive shaft, and adjustment means connecting said alternator to said tower corner rails;
   said adjustment means including at least one wedge block interposed between said alternator and one of said tower corner rails and a wedge block moving means connected to said wedge block to change the position of said wedge block with respect to said one tower corner rail for changing the orientation of said alternator with respect to said tower corner rails and adjusting the orientation of said alternator with respect to said drive shaft so that said alternator armature shaft and said drive shaft are aligned to be coaxial with each other.

5. The wind electric power plant defined in claim 4 wherein said wedge block is mounted on said alternator.

6. The wind electric power plant defined in claim 5 wherein said wedge block moving means includes a bore defined in said wedge block and an eye bolt mounted in said bore.

7. The wind electric power plant defined in claim 4 further including a wedge block interposed between said alternator and each tower corner rail.

8. The wind electric power plant defined in claim 6 further including a cross brace mounted on said tower corner rails, and a hanger bar mounted on said cross brace, said eye bolt being attached to said hanger bar.

9. The wind electric power plant defined in claim 4 wherein said propeller and tail sections are demountably mounted on said gear section.

10. The wind electric power plant defined in claim 4 further including rail mounting means for mounting said tower corner rails onto other corner rails.

* * * * *